Sept. 29, 1925.  
C. E. BULTMAN  
HEAT INSULATED DISH  
Filed June 26, 1922

1,555,399

Charles E. Bultman.

INVENTOR

BY Thomas G. Steward,

ATTORNEY.

Patented Sept. 29, 1925.

1,555,399

UNITED STATES PATENT OFFICE.

CHARLES E. BULTMAN, OF CHICAGO, ILLINOIS, ASSIGNOR TO THE MANTLE LAMP COMPANY OF AMERICA, OF CHICAGO, ILLINOIS, A CORPORATION OF ILLINOIS.

HEAT-INSULATED DISH.

Application filed June 26, 1922. Serial No. 570,871.

*To all whom it may concern:*

Be it known that CHARLES E. BULTMAN, a citizen of the United States, residing at Chicago, in the county of Cook and State of Illinois, has invented certain new and useful Improvements in Heat-Insulated Dishes, of which the following is a specification.

The invention herein revealed, relates to heat-insulated receptacles of the type wherein an inner vitreous or frangible container is fixed in an outer protective jacket spaced therefrom by a body of heat-insulating material or by a body of air, and said invention consists of means whereby the jacket and the container are permanently united, and whereby the container is further heat insulated and protected from shocks.

The invention will be best understood by referring to the accompanying drawing, in which—

Figure 1:
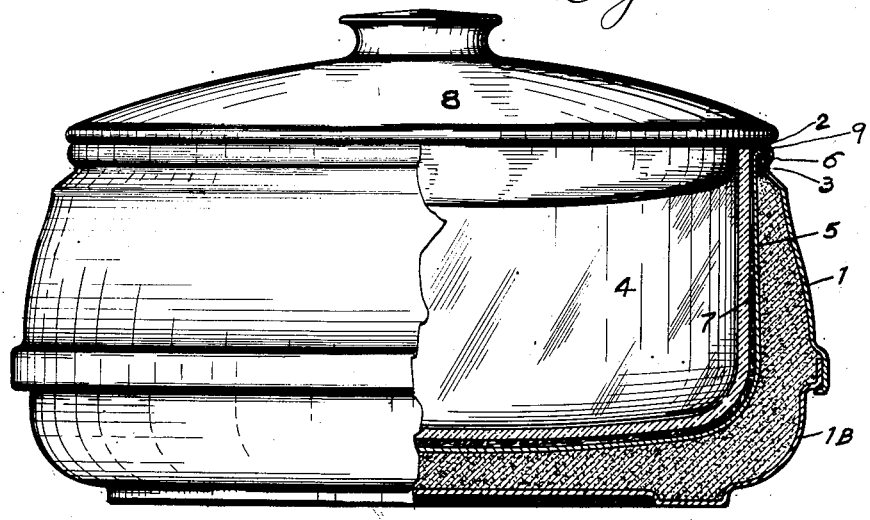
Figure 1 is a view in elevation, parts being broken away to show the essential features of the receptacle in section.
Figure 2:
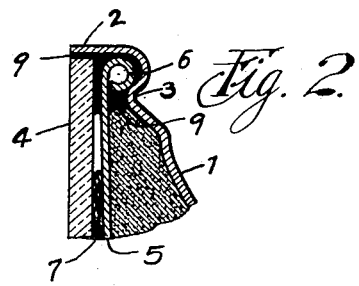
Figure 2 is an enlarged view of a part of Figure 1.

The protective jacket may be made of metal, such as aluminum and consist of an upper section 1 and a lower section 1ᴮ. The upper section 1 is provided at its upper edge with an annular flange 2, below which is an inwardly extending bead 3.

The container 4 is preferably made of glass, this substance being a poor conductor of heat and easily cleaned. Any suitable corkage such as 8 may be employed as a closure for the container.

The container 4 is sealed to the jacket 1 by a suitable bonding material 9, such as heat treated lac. The suspension of the container from the jacket 1 is reinforced by a metal shell 5 having an out-turned bead 6 sustained by the bead 3, this shell being separated from the container by a layer of paper 7 which heat insulates and cushions the container.

The assemblage of this receptacle may be made by spinning the bead 3 under the bead 6 before the bonding material 9 is hardened. The assemblage may also be made by spinning the flange 2 over the upper edge of the container 4, after the parts are together. The former method of assemblage is preferable.

Having thus described my invention, what I claim is:

1. A heat-insulated receptacle including an outer jacket, a frangible inner container, and a pendent shell supporting enclosing and protecting said container, said jacket being heat-insulated from said container and said container and said shell being permanently united.

2. A heat-insulated receptacle including an outer jacket, a frangible inner container, and a pendent metal shell supporting enclosing and protecting said container, said jacket being heat insulated from said container and said container and said shell being permanently united.

3. A heat-insulated receptacle including an outer jacket, a frangible inner container heat insulated from said jacket, a pendent protective shell enclosing said container, and a layer of heat-insulating material disposed between said shell and said container and said container and said shell being permanently united.

4. A heat-insulated receptacle including a protective jacket having an inner rib or shoulder and an inturned flange, a frangible container heat-insulated from and supporting said jacket, and a shell surrounding said container and provided with a bead disposed between said rib and said flange.

5. A heat-insulated receptacle including a protective jacket, having an inner rib or shoulder and an inturned flange, a frangible container heat-insulated from said jacket, a shell surrounding said container and having its upper edge disposed between said rib and said flange, and a mass of bonding material enclosing said upper edge and contacting with said rib and said flange.

In testimony whereof I affix my signature.

CHARLES E. BULTMAN.